United States Patent [19]
Van Tyne et al.

[11] Patent Number: 5,073,954
[45] Date of Patent: Dec. 17, 1991

[54] BAR CODE LOCATION AND RECOGNITION PROCESSING SYSTEM

[75] Inventors: Richard G. Van Tyne, Richardson; Marion W. Neff, Euless; George R. Mondie, Bedford, all of Tex.

[73] Assignee: ElectroCom Automation, Inc., Arlington, Tex.

[21] Appl. No.: 317,293

[22] Filed: Feb. 28, 1989

[51] Int. Cl.$^5$ .......................... G06K 9/00; G06K 7/10
[52] U.S. Cl. ..................................... 382/18; 235/462; 235/463; 235/494
[58] Field of Search ............... 235/436, 437, 462, 463, 235/494; 382/1, 18, 51

[56] References Cited

U.S. PATENT DOCUMENTS

| | | | |
|---|---|---|---|
| 3,790,756 | 2/1974 | Graves et al. | 235/462 |
| 4,608,489 | 8/1986 | Ramsey et al. | 235/462 |
| 4,641,018 | 2/1987 | Mazumder et al. | 235/462 |
| 4,916,298 | 4/1990 | Raphael | 235/463 |

Primary Examiner—Leo H. Boudreau
Attorney, Agent, or Firm—Harold E. Meier

[57] ABSTRACT

The present invention provides for a bar code location and recognition processing system. The surface on which the bar code appears is optically scanned and converted to binary digital signals by a digital video processor. The output of the digital video processor is provided to a bar code image processor for location and reading of the bar code. The bar code is located by summing the "black" pixels in segments of predetermined width for each horizontal scan line, and determining the location of the "L" pattern characteristic of a digitized image of a bar code summed in this manner. Reading of the binary data corresponding to the bar code is carried out by summing the "black" pixels in each vertical scan line in a rectangular region generally corresponding to the location of the bar code within the digitized image, selecting a threshold value proportional to the average maxima of these sums, and, by determining which sums substantially exceed and which substantially fall below the threshold values, decode a binary code pattern corresponding to the bar code.

17 Claims, 7 Drawing Sheets

BAR CODE LOCATION AND RECOGNITION PROCESSING SYSTEM

FIELD OF THE INVENTION

The present invention relates generally to optical character scanning recognition systems, and more particularly to locating and recognizing bar codes within an electronically scanned optical image.

BACKGROUND OF THE INVENTION

Optical character recognition systems, or optical scanners, have become increasingly useful for reading data in a wide variety of applications. Optical character recognition systems are used to sort the large volumes of incoming mail received by banks, credit institutions, taxing authorities, postal services, and department stores and to store information from other documents, in digital form, in a memory device.

Recent developments in data handling have further emphasized the need to quickly and accurately identify coded data, such as bar code patterns for purposes of location, sortation or routing. Bar codes have become a popular method of manifesting coded information for sorting large volumes of materials. For example, with the ever-increasing volume of letter mail, there is a need for a rapid, accurate identification of bar code patterns in which address information is encoded by the height of equally-spaced bars of equal width for mechanical sorting to ensure rapid and accurate mail deliveries. The transport velocities of this mail is often very high, usually between 100 and 200 inches per second. Similarly, document identification and sortation is also a significant problem in many industries such as banking and insurance, where a significant volume of paperwork must be processed daily on a reliable basis.

The rapid identification of bar codes is often impeded by certain adverse conditions. In applications, for example, where coded information is utilized to sort returnable media, and in the warehousing industry, the data code manifestations are subject to rough usage and parts thereof are distorted if not destroyed. The surface on which the manifestation of the coded data may appear may be distorted or cause the manifestation to be distorted. Furthermore, as with letter mail, the data code manifestations are subject to being over-written or otherwise marked over. The very rapid speeds at which the bar code must be located, interpreted, validated as to its proper format, corrected when errors are identified and, when multiple valid codes appear, the appropriate code selected magnifies the effects of these adverse conditions. As compared to bar codes such as the Uniform Product Code in which the information is coded by the width or thickness of the bar, bar codes in which information is encoded according to the height of equally spaced bars of equal width require much more computation and, therefore, time to locate and recognize. At very high transport velocities of the surface of the object imprinted with bar code patterns in which bars vary in height, a system is required to provide for quick and reliable location and recognition of bar codes with a minimum amount of computation, and therefore minimum time and cost, in the presence of the adverse conditions outlined above. In particular, the United States Postal Service has proposed and uses bar codes having full bars and half bars as set forth in Address Block Bar Code, United States Postal Service Development Specification dated Sept., 1987. There is, therefore, a specific need for a bar code identification and recognition system to locate and read reliably over 95% of the POSTNET bar codes on mail, as required by the United States Postal Service, at letter transport speeds of between 100 and 200 inches per second. More generally, there is a need for an optical character recognition system that is capable of reliably locating and reading bar code data on the surfaces of objects, or other types of surface manifestations at very high rates and velocities, possibly with physical distortions and with the bar code partially obscured by over-writings and stray marks.

SUMMARY OF THE INVENTION

The present invention provides for an apparatus and method for locating and reading, at very high velocities and with great reliability bar codes in a number of adverse conditions, particularly those encoded by bar height. Most particularly, although not limited to this application, the present invention provides for an apparatus and method of accurately locating and reading, at rates of between 100 and 200 inches per second, letter mail printed with POSTNET bar codes. Furthermore, the present invention provides for decoding of a POSTNET bar code pattern, checking and correction of errors in the extracted code, prioritization of multiple POSTNET patterns, and output format generation.

When presented with the surface of an object or a document on which a bar code is located, an optical scanner lifts an image from the surface of the document or object. In optical scanning, the surface of the object is, in effect, turned into an array of discrete dots, call pixels, evenly spaced horizontally on each row and evenly spaced vertically in each column. A typical, commercially available charge coupled device linear scanning device (CCD LSD) has an array of photoelectric sensors, one sensor per pixel, to scan the surface of the object. Each photoelectric sensor emits an analog signal corresponding to the amount of light reflected to it by the scanned surface. The analog signals are converted into digital form with one binary bit per pixel—one value corresponding to the color white and the other value to the color black. This conversion creates a high contrast, digital image of the surface for use in locating and recognizing the bar code.

Converting the analog signal to a one bit binary digital signal requires a determination of whether a particular pixel is "white" or "black." The "blackness" sensed by one cell may differ from an immediately adjacent cell reading the same character. Furthermore, the same photoelectric cell may sense different degrees of "blackness" and "whiteness," even within the same surface of an object, caused by unevenness in printed characters on the surface of the object to be read, differences of the objects to be read, or the photoelectric sensors themselves. Making the decision as to whether a pixel should be "white" or "black" from the analog signal is extremely complicated and critical to reliably locating and recognizing the bar code.

One feature of the present invention that locates and recognizes bar codes is a digital video processor that determines whether a pixel is "white" or "black." Such a video processor can be like the commonly assigned copending U.S. Pat. Application Ser. No. 07/110,935, filed Oct. 20, 1987 for a PROGRAMMABLE OPTICAL CHARACTER RECOGNITION SYSTEM. The digital video processor pre-processes the analog signal in the digital-to-analog conversion process so as to provide approximately constant width for each bar in the bar code. As the following description will show, having a constant width is important to locating and recognizing the bar code by the present invention.

The digital video processor provides the binary digital data converted from the analog signal, the digital image, to a Bar Code Image Processor, which performs the functions of locating, recognizing, decoding, error checking and correction, and prioritization of multiple bar code patterns. The Bar Code Image Processor first must locate within the digital image the bar code pattern. After locating the bar code pattern, the Bar Code Image Processor next "recognizes," or reads, the particular full-bar half-bar pattern of the bar code, which may appear anywhere within the digital image. After recognition of the bar code pattern, it is then decoded into a binary digital signal. The Bar Code Image Processor can also perform, when it decodes the bar code pattern, the task validating the bar code by checking for errors and, when possible, correcting the error, and by determining whether the bar code pattern follows the correct format. The Bar Code Image Processor of the present invention performs the above-mentioned tasks as well as, when confronted with more than one bar code pattern, determine the code of highest priority. The output of the Bar Code Image Processor is a binary digital signal corresponding to the bar code pattern, which can be provided, for example, to a data storage device or apparatus for sorting or routing.

Because the bar code pattern has a relatively constant pitch, it is tempting to use this information in locating the bar code patterns. Most techniques which can be used for this purpose are computationally intense, and therefore slow. Furthermore, they could, probably, not be initiated until the full digital image has been captured.

The methods by which the Bar Code Image Processor locates and recognizes the bar code pattern especially the full-bar, half-bar variety, within the digital image is novel, very reliable and very quick because it is not as computationally intense and can be initiated even while the scanning continues of the same object. To understand these methods, consider the digital image as a two-dimensional array of horizontal and vertical scan lines. Because of the bar code's peculiar full-bar and half-bar pattern, counting the number of "black" pixels in the horizontal scan lines and vertical scan lines, and comparing them to adjacent horizontal number of black pixels in adjacent segments of the horizontal or vertical scan lines, respectively, can provide the information necessary to locate and recognize the bar code pattern. For example, with a POSNET bar code, for every ten bars, both half and full bars, there are four full bars. In other words, the ratio of the number of full bars to total number of bars in a bar code pattern is two-fifths (2/5). By scanning horizontally across the bar code patterns over a distance equal to ten bars, there will be a set of horizontal scan lines having only forty percent of the digitized number of "black" pixels as a set of horizontal scan lines immediately adjacent and below the first set. The point at which there is an abrupt change in the number of black pixels in the horizontal scan lines is a strong indication of the presence of a full-bar, half-bar code.

To locate a POSTNET bar code pattern within the digital image, the horizontal scan lines of the digital image can, therefore, be divided into segments such that ten bars of the bar code pattern may fit within each segment. For each horizontal scan line, the number of black pixels within each segment is counted. Each count in each segment can be displayed as a horizontal histogram. A histogram is constructed for each segment of each horizontal line, called horizontal histogram segments. If the digital video processor pre-processes the digital image such that the bars have widths of approximately the same number of "black" pixels, the bar code extends more or less in the horizontal, the horizontal scan lines passing through the bottom half of and along the length of the bar code pattern will count, for each ten-bar segment, the number of "black" pixels proportional to the total number of bar codes; and those passing through the top half of the bar code will count the number of "black" pixels proportional to the number of full-bar lines within each segment. The horizontal scan lines that have scanned across the bar code will have horizontal histogram segments such that, when placed side-by-side, will create an "L" pattern. This distinctive "L" pattern, which can easily be recognized by the naked eye, can also be recognized by an apparatus in real-time, such as a computer or other specially programmed device with standard histogram analysis techniques.

In the preferred embodiment, the segments are chosen to be thirty-two pixels wide and the horizontal histograms are formed by adding, for example, the number of pixels in segments one through five, two through six, and so on. By counting over successive segments the effect of noise can be minimized and the characteristic "L" pattern emphasized. Ideally, counting across the entire horizontal scan line can provide the most distinctive pattern. However, by choosing to count, for example, over the segments, the effect of a skewed bar code pattern, that is one that is not parallel to the direction in which it is being transported and scanned, is minimized. The segments are made thirty-two pixels wide for greater resolution but so as to include at least one bar within the segment. The location of this "L" shaped pattern provides the location of the bar code pattern in terms of a rectangular region having left, right, top and bottom boundaries from which the process of recognizing the bar code pattern can be made.

To recognize the bar code pattern, vertical histograms are constructed for each vertical scan line. After receiving the location of the bar code, the region of the digital image corresponding to this location is extracted. For each vertical scan line, the number of "black" pixels is counted within the extracted region of the digital image to form a set of vertical histograms. The vertical histograms typically have three different peaks. Highest will be those histograms corresponding to the full bars. Of medium height will be the vertical histograms corresponding to the half-bars. Of lowest height will be those due to the background on which the bar code is printed. The maxima of the vertical histograms that have counts consistent with counts that would be expected given the pitch, or height, of the actual bar code pattern appearing on the surface of the scanned object, are located, counted and analyzed. Two threshold values are chosen according to standard histogram analysis techniques: a low threshold to distinguish between background noise and the peaks due to the bar code pattern; and a high threshold to distinguish between peaks due to half-bars and to full-bars. These thresholds are very dynamic, and may even vary among bar code patterns on the same envelope because of background noise or other characteristics of the surface on which the bar codes are printed. This vertical histogram, threshold-finding approach provides the flexibility to cope with these variations. Again, it is important to have a well-processed digital image from the video image processor such that the pitch of the full bars and the half-bars is relatively constant. Each bar corresponds to one binary bit: a full-bar corresponds to a digital value of one; a half-bar to a digital value of zero.

After the bar code pattern has been recognized and binary data generated from it, it can be examined for validity, i.e., whether it is a valid bar code pattern. For example, a particular bar code must, typically, have a certain number of total bits or bars. The recognized bar code pattern is also checked for errors, and these errors corrected, if possible. With the present invention, unlike other prior art bar recognition systems, correction of errors may be done by a reinterpreting of the extracted image by adjusting the threshold values with the vertical histograms. This capability provides for more highly reliable recognition of the bar code over prior art systems.

Although the present invention provides for many additional advantages, in addition to increased reliability, over prior art, several advantages bear pointing out. Of consequence to the speed at which the bar code can be recognized is the ability of the present invention to begin to form horizontal histograms even before the scanning of the object is finished. Once the "L" pattern is recognized from the constructed horizontal histograms, this information can be stored and immediately used for the recognition process. Furthermore, the histograms are "running," meaning that they are constructed in real-time. Real-time processing minimizes the effects of noise and skew. Other advantages will become apparent in the detailed description which follows.

Although the present invention has been described in reference to a full-bar/half-bar code, and in particular to POSTNET, the present invention may also be employed to locate and recognize other full-bar, half-bar codes, as well as any other bar code encoded by varying the heights of equal-width bars.

DETAILED DESCRIPTION OF THE DRAWINGS

The following detailed description is a description of the present invention's application to locating and reading POSTNET bar codes. It may, however, be equally applicable to other forms of bar codes that have fixed ratios of full-bars to total number of bars or to bar codes with more than two different heights. It also may be applicable to other codes in which there are characteristics which make location, the recognition or both of them possible using the histogram analysis.

Figure 1:
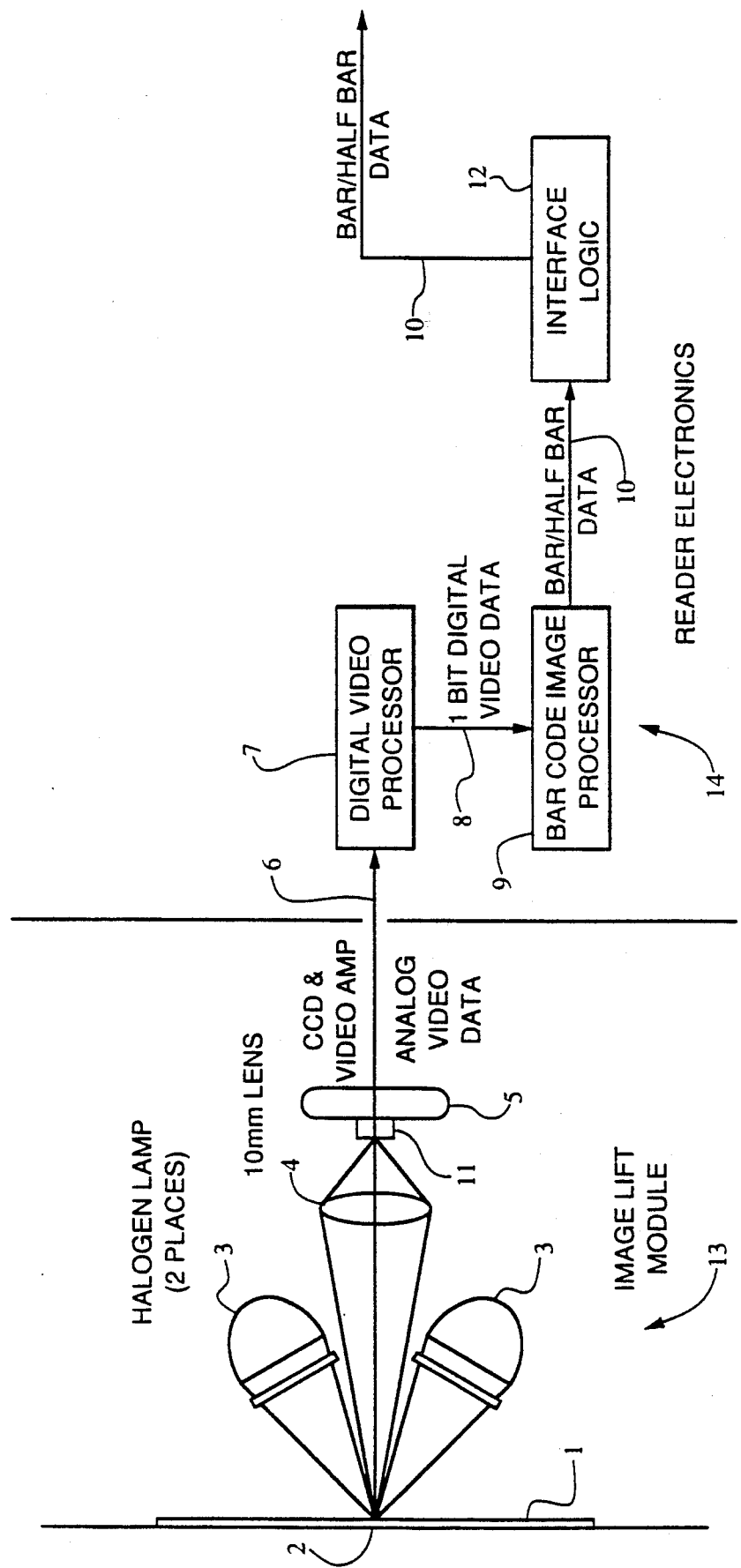
FIG. 1 is a functional block diagram of the bar code location and recognition processing system.

FIG. 1 is a functional block diagram of the bar code location and recognition system of the present invention. It is comprised of an image lift module 13 and reader electronics 14. Mailpiece 1 is printed on its face with a POSTNET bar code within a four inch vertical field, referenced by numeral 2, of view of CCD Linear Scanning Device 5. Mailpiece 1 is illuminated by dual tungsten/halogen lamp assemblies mounted on each side of the scanning aperture 11. An all-dichroic multilayer heat reflecting optical filter can be positioned between the lamp assemblies 3 and mailpiece 1, to provide in combination with the silicon spectral absorption characteristics of the CCD Linear Scanning Device 5 a system that performs to the official United States Postal Service Spectral Response Curves defined in Publication 25. Lens 4 is placed between mailpiece 1 and scanning aperture 11 of CCD Linear Scanning Device 5. It has a 10 millimeter focal length which will provide, at the desired magnification ratio of 13.5 to 1, an overall track length (object-to-image distance) estimated to be less than 9 inches. The field of view 2 is focused on CCD Linear Scanning Device 5. The CCD Linear Scanning Device 5 is selected to be a 512×1 pixel device. The analog video data signal from the CCD Linear Scanning Device 5 is level-shifted, buffered, amplified and sent to the digital video processor 7 via a 50 ohm coax cable 6. It should be appreciated that the CCD Linear Scanning Device 5 can be replaced with any suitable photoelectric sensor or other similar means to convert an optical image to an electronic signal.

Digital video processor 7 pre-processes and converts the analog video data signal into a "black" and "white" one-bit binary digital data signal on line 8, which is supplied to bar code image processor 9. The binary digital video data signal on line 8 can be used to reconstruct a digital image of the scanned field of view 2. Bar code image processor 9 receives the binary digital video data signal and performs the function of locating, recognizing, decoding, error checking and correcting the bar code and the binary data it encodes. The output of the bar code image processor 9 is a one-bit binary digital data signal 10 corresponding to the decoded binary bar/half-bar pattern, if any, contained within the field of view 2. Interface logic 12 acts as an interface between the reader electronics 14 and post-processing uses of the one-bit binary digital data signal 10.

Figure 2:
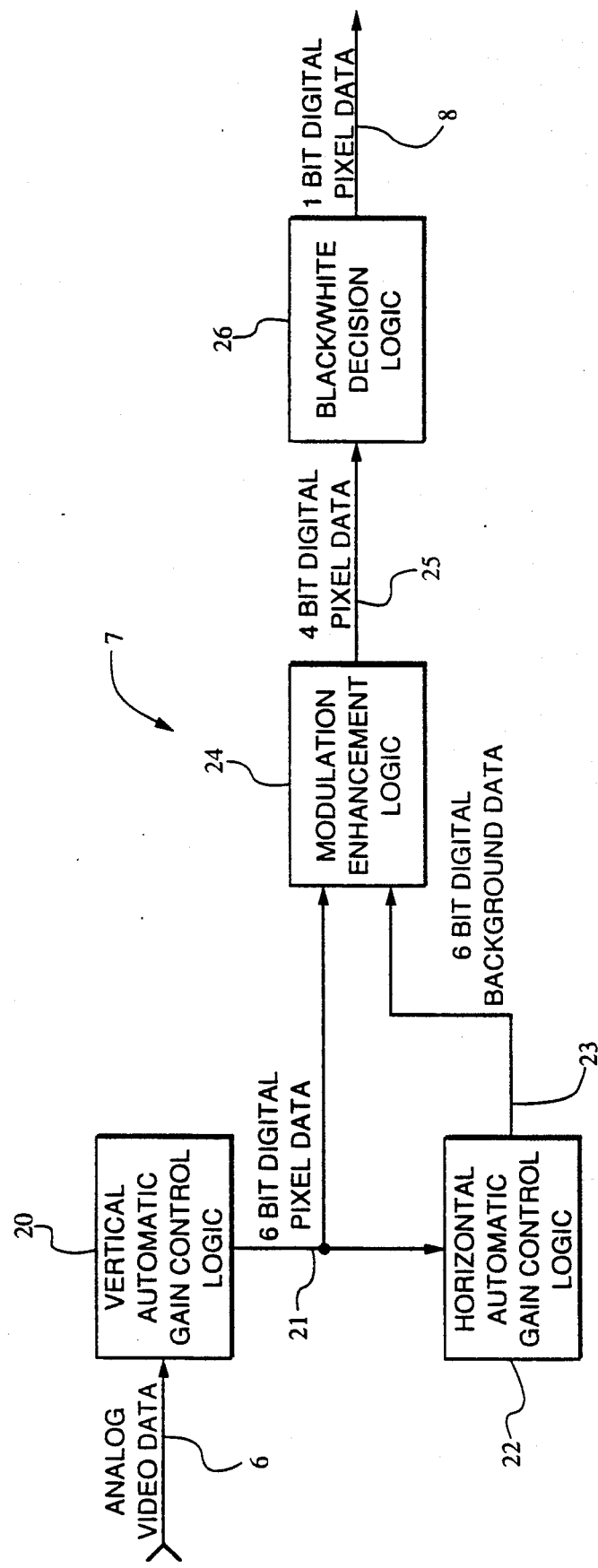
FIG. 2 is a functional block diagram of the digital video processor.

FIG. 2 shows the functional block diagram of the digital video processor 7. A full and complete description of it can be found in commonly assigned, copending U.S. Pat. Application Serial No. 07/110,935, filed Oct. 20, 1987 for a PROGRAMMABLE OPTICAL CHARACTER RECOGNITION SYSTEM. A brief description of the digital video processor 7 follows.

The digital video processor 7 performs several basic functions: vertical gain control, horizontal gain control, modulation enhancement, and black or white decision-making. The analog video data signal 6 of the CCD Linear Scanning Device is presented to the vertical automatic gain control logic (VAGC) 20. The VAGC circuit converts the analog video data signal on line 6 into six-bit digital pixel data signal on line 21. The VAGC also dynamically adjusts the analog-to-digital converter such that the brightest elements in a scan line have the maximum digital value possible after the conversion process. This is done by monitoring the values for each element in a scan line and modifying the gain according to rules programmed into a memory device. If a predetermined number of elements are at or near the maximum value, no change is made. If too many elements are at the maximum value, the gain for the next scan line is decreased. If too few elements are at the maximum value, the gain for the next scan line is increased. This process is repeated for every scan line of the image and provides automatic correction for general document reflectance variations.

The six-bit digital pixel data signal on line 21 is presented to horizontal automatic gain control logic (HAGC) 22, as well as to modulation enhancement logic 24. The HAGC circuit is designed to dynamically correct for variations in the VAGC output caused by labels and inserts that may be visible through windows that exhibit a different reflectance than the general envelope. Pixels in the same scan line and in the same general area, generally two pixels above and two below, are analyzed and the maximum value is established as the current background value for a pixel. This current background value is compared to the previous background value and based on the relative values of the previous and of the current background values are used to calculate a new background value. The new background value is stored in a RAM and becomes the previous background value used for the following scan. This processing is performed for each Pixel element in the scan line in real-time and provides a means to reduce the effect of horizontal bands of different reflectance. The output of the HAGC 22 is a six-bit digital background data signal on line 23, which is presented to the modulation enhancement logic 24.

Modulation enhancement logic 24 converts the six-bit digital pixel data signal on line 21 to a maximum modulation four-bit pixel data signal on line 25 on a pixel-by-pixel basis by comparing the present six-bit pixel data value to the previous background value for that pixel. The four-bit value produced is generally proportional to the ratio of the pixel value that is divided by the previous background value multiplied by 16. This processing is done for each pixel element in the scan line in real-time and provides a means to extract bar code information from a wide range of potentially interfering backgrounds. The rules governing the extraction process can be changed by modifying the contents of a programmable memory device.

The four-bit digital pixel data signal on line 25 is presented to the black/white decision logic 26. The black/white decision logic 26 determines on a pixel-by-pixel basis whether a particular pixel is either "black" or "white" and presents a one-bit binary digital pixel data signal on line 8, a digital one being a "black" pixel and a digital zero being a "white" pixel, to bar code image processor 9. The black/white decision logic 26 basically performs a two-dimensional differentiation on the image field. The average of the four-bit digital data values corresponding to each pixel in a five pixel by five pixel matrix surrounding the pixel of interest are averaged. From this average, two variables are determined, K1 and K2. If the value of the pixel of interest minus K1 is less than this average, the pixel of interest is called black. If the pixel of interest plus K2 has a value greater than this average, the pixel of interest is called white. The rules governing this comparison function and the generation of K1 and K2 are programmed into a programmable memory device and can be changed.

Figure 3:
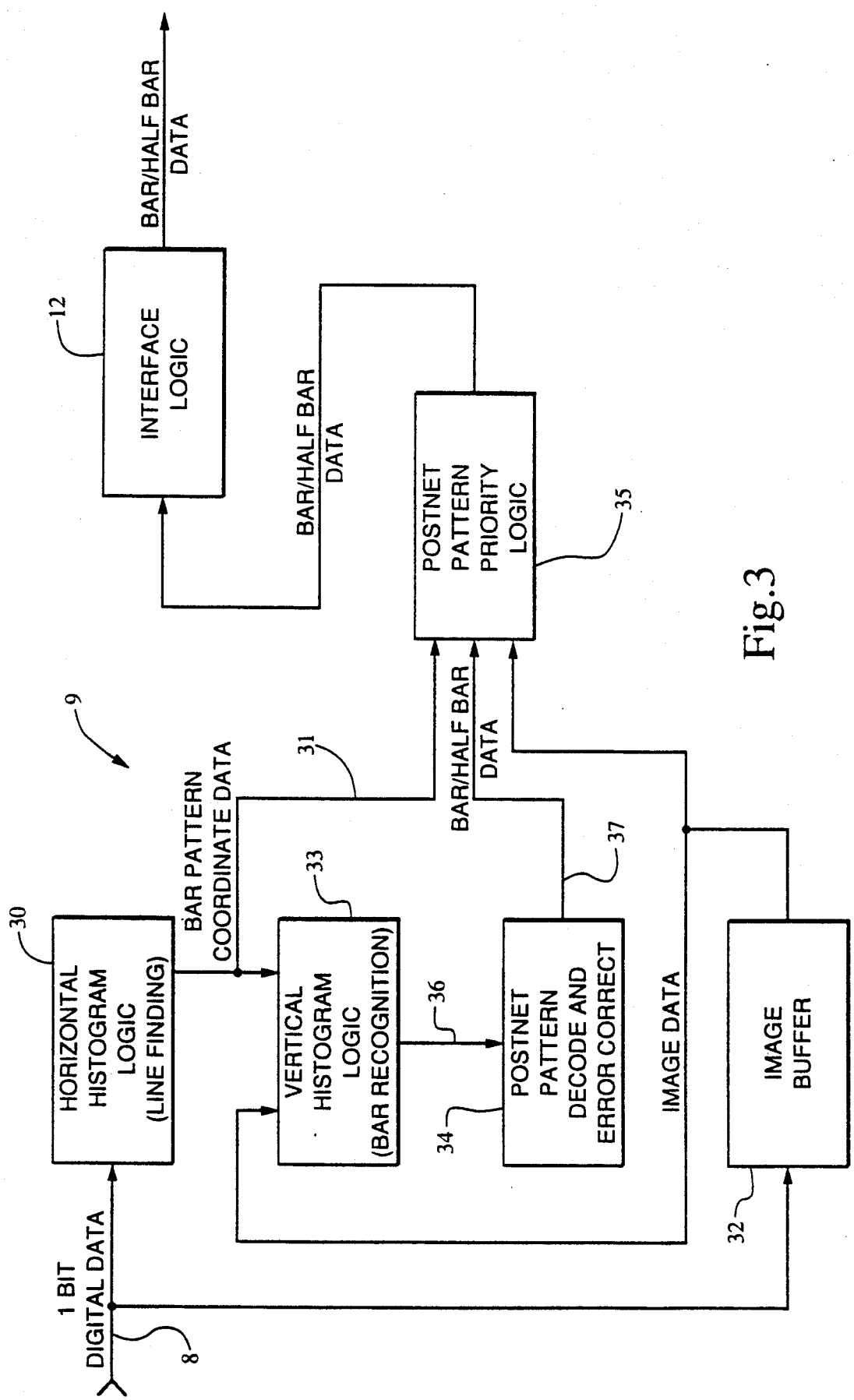
FIG. 3 is the functional block diagram of the bar code image processor.

FIG. 3 shows the functional diagram of the bar code image processor 9. The one-bit per pixel binary digital data signal on line 8 is presented to horizontal histogram logic 30. As the one-bit per pixel binary digital data signal on line 8 is received by horizontal histogram logic 30, a set of accumulators or other devices for summing the number of black pixels for each horizontal scan line begins to count black pixels in a predetermined number of successive segments of 32 pixels in width, each approximately one-fifth of an inch, of each horizontal scan line.

Figure 4:
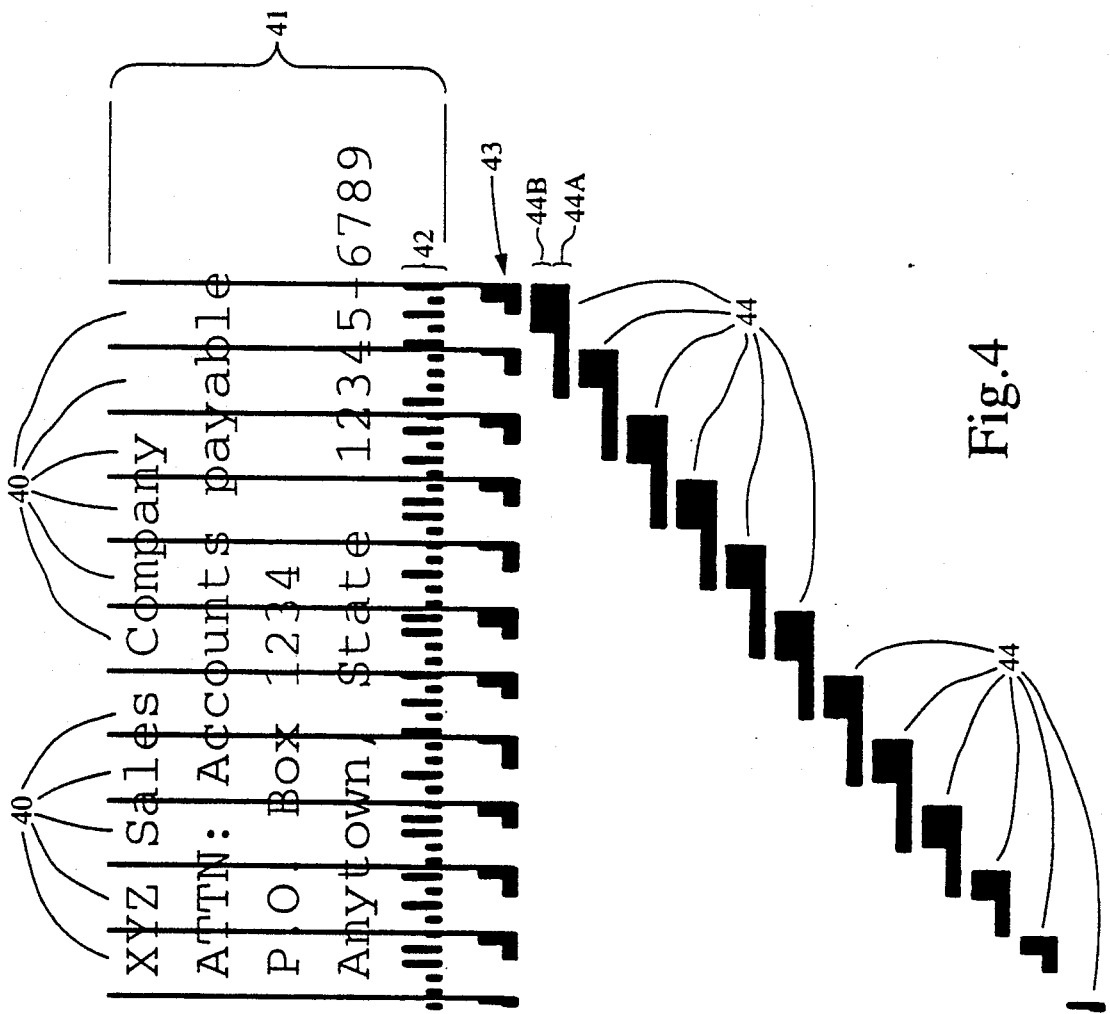
FIG. 4 demonstrates the characteristic pattern of horizontal histograms of a POSTNET code.

FIG. 4 is an example of the characteristic pattern of horizontal histograms of a POSTNET code. The outside of a mailpiece contains an address 41 and a POSTNET bar code 42. The address and bar code would be scanned using image lift module 13 (as shown in FIG. 1), and digitized and processed by digital video processor 7 into one-bit binary digital video data. The bar code image processor 9 would, for each horizontal scan line, sum the number of black pixels within each segment 40. Horizontal histogram segments 43, of 32 pixels each, are shown just for bar code 42. Full horizontal histograms 44 are the sum of two successive horizontal histogram segments 43. As was stated earlier, for every ten bars, there are four full-height bars. This produces the characteristic "L" pattern shown by full horizontal histograms 44, wherein the top half of full horizontal histograms 44B is forty percent of the value of the bottom half 44A. Segments 40 were chosen such that each contain five bars, and therefore, two segments are required to demonstrate the characteristic "L" pattern of the horizontal histograms of a POSTNET code.

Figure 5:
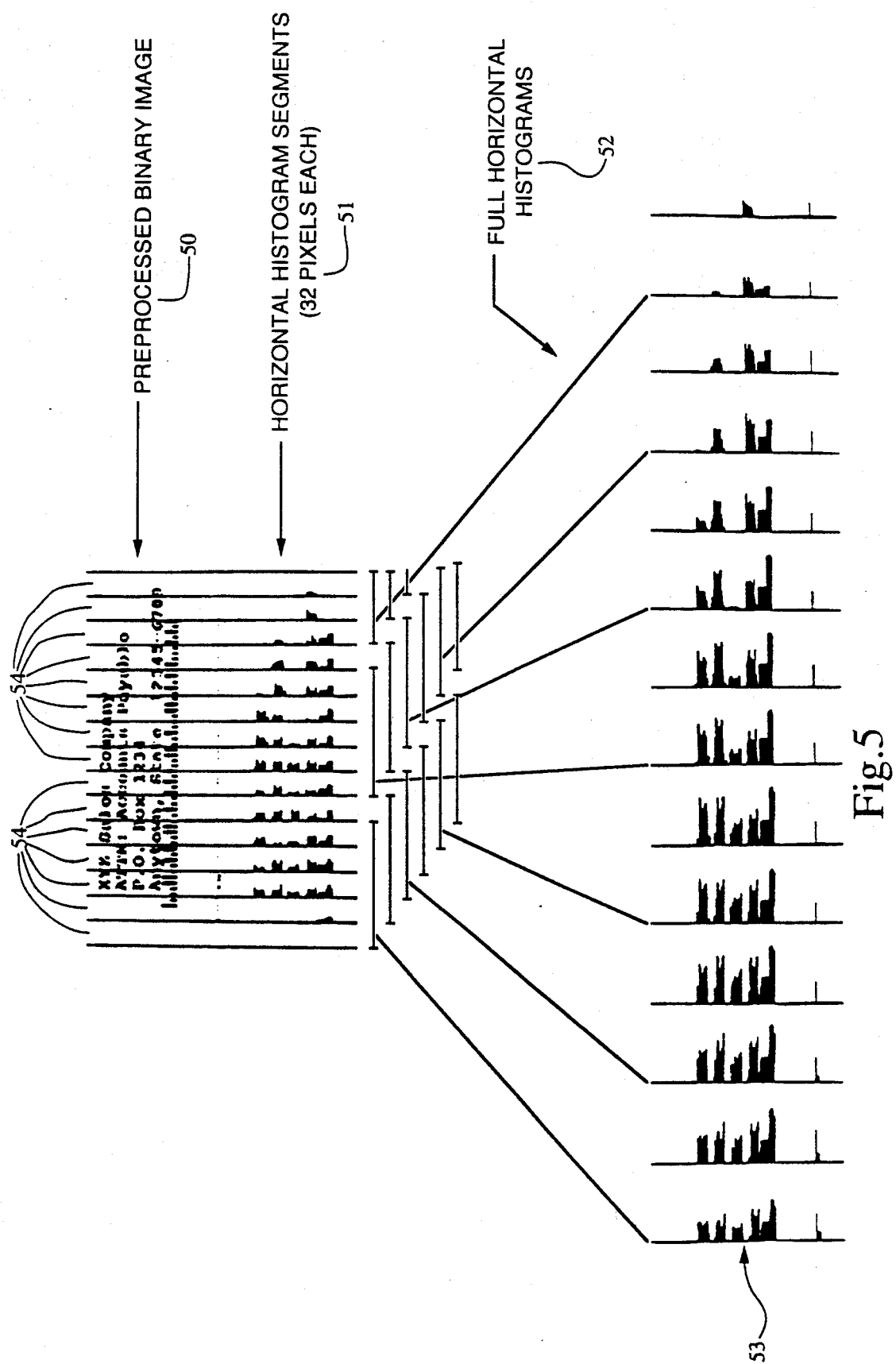
FIG. 5 is an example of horizontal histograms for a typical address block appearing on letter mail.

FIG. 5 shows horizontal histogram segments and full horizontal histograms for an entire digitized image. The preprocessed binary image 50 is reconstructed from the one-bit binary digital video data output 8 of the digital video processor 7. The horizontal histogram segments 51 are shown for the entire preprocessed binary image 50. Unlike FIG. 4, the full horizontal histograms 52 are constructed from the sum of five successive segments, each 32 pixels in width. Reference number 53 points to the horizontal scan lines corresponding to the bar code in the preprocessed binary image 50. Thus, as can be seen along line 53, there is the characteristic "L" pattern formed by the full horizontal histograms. The values summed in the accumulators, if displayed as a histogram, would the full horizontal histograms along horizontal scan lines 53.

The accumulators constitute running full horizontal histograms which begin counting as soon as the one-bit per pixel binary digital data 8 is received. The running full horizontal histograms are stored in one area of the dual-ported image buffer 32. If each horizontal scan line contains the number N of pixels necessary to capture the width of the scanned field of view 2, and each vertical scan line contains 512 pixels required for a four-inch high image at 125 pixels per inch, the data for the horizontal histogram analysis is contained in an array of 512 words (one per horizontal scan line) by N/32 words (one word per thirty-two vertical scan lines.) Dual-ported image buffer 32 also stores the one-bit per pixel binary digital data signal 29 in a different area.

The full horizontal histogram data can be provided to the system almost as soon as it begins to appear in the image buffer 32 even as it continues to store the one-bit per pixel binary digital data signal 8. This approach permits the location and even the recognition of the bar code to begin while the surface of the mailpiece is still being scanned. The location of the beginning of a full-bar and half-bar code is identified by the appearance of the characteristic "L" pattern of histograms on a series of scan rows. The "L" pattern can be done with a programmed computer or other equivalent apparatus by looking for abrupt changes in the histogram from one horizontal scan line to the next. For example, in FIG. 5, the bottoms of the "L" / patterns appearing along line 53 demonstrate, starting from the bottom, an abrupt change from a zero pixel count to a rather large black pixel count for the full horizontal histograms. Then, there is another abrupt change from a relatively high black pixel count to a black pixel count having a value of approximately forty percent. Next, there is another abrupt change to a relatively low black pixel count. By looking for these abrupt changes, the top and bottom of the bar code can be located. Successive "L" patterns in the same scan rows are associated to provide full vertical and horizontal location information. As soon as the end of the bar code is recognized, by white in a histogram segment or a succession of non-bar coded segments, location information for the full bar code is available to immediately extract its image data from the image buffer.

Figure 6:
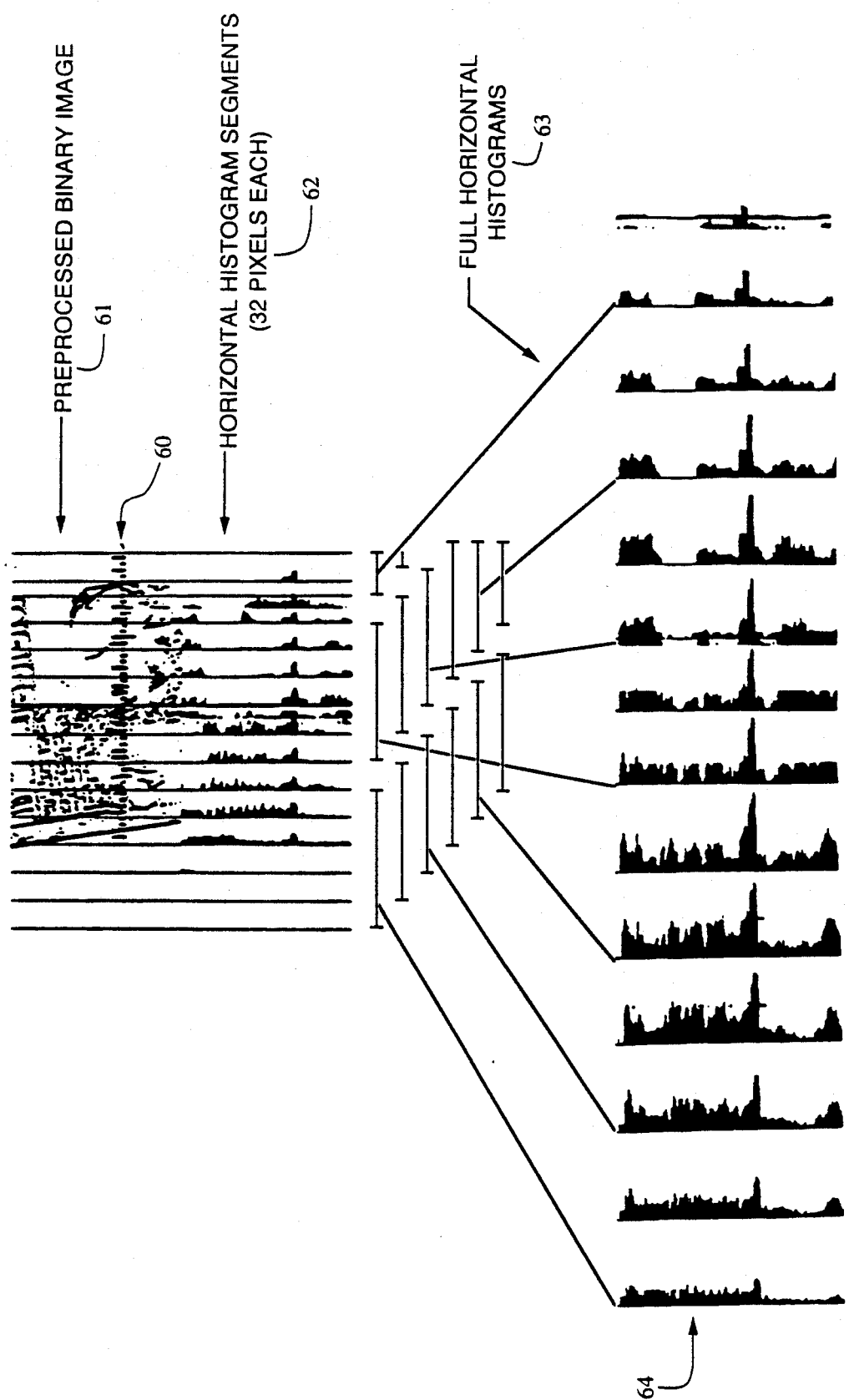
FIG. 6 is an example of horizontal histograms for a bar code printed on an extremely noisy background.

FIG. 6 demonstrates that the characteristic "L" pattern is discernable even in the presence of extremely heavy background noise. Preprocessed binary image 61 displays printed matter covering parts of the bar code 60. Reference number 64 points to the line of full horizontal histograms 63 corresponding the bar code 60.

Referring back to FIG. 3, the output of the horizontal histogram logic 30 is the bar pattern coordinate data signal on line 31, which provides the coordinates that defines a rectangular region by its top, bottom, left and right boundaries.

The bar code pattern coordinate data signal on line 31 is presented to vertical histogram logic 33 for bar recognition. The vertical histogram logic 33 extracts from the image buffer the rectangular region defined by the bar pattern coordinate data, and constructs a series of vertical histograms by summing the number of black pixels in a vertical scan line from the bottom of the rectangular region to the top of the rectangular region. The resulting vertical histograms look very much like the bar code itself. The maxima of these vertical histograms, to a full height maxima corresponding to full-bars and medium height maxima corresponding to half-bars, that are consistent within a predetermined tolerance of the pitch of the POSTNET code are, with standard histogram analysis techniques, located, counted, and analyzed to select two thresholds. As these thresholds may vary significantly, even among those from the same envelope, the thresholds must be redetermined for every new rectangular region. A lower threshold value separates all the bars from the background noise occurring between the bars, and an upper threshold value separates the full-bars from the half-bars. Off-pitch vertical histograms, that is to say those with values which do not fall within the tolerance of the pitch of the POSTNET code, are ignored. After the lower threshold value is used to separate the bars from the background, the upper threshold value is then used to identify full-height bars that are well above the upper threshold value and half-height bars that are well below the upper threshold value. It is possible in some cases with marginal print quality or noise for some maxima to be at or near the threshold. In this situation, it is better to mark the bars indeterminate and use error correction data to evaluate it than to depend strictly upon the threshold.

Figures 7, 8:
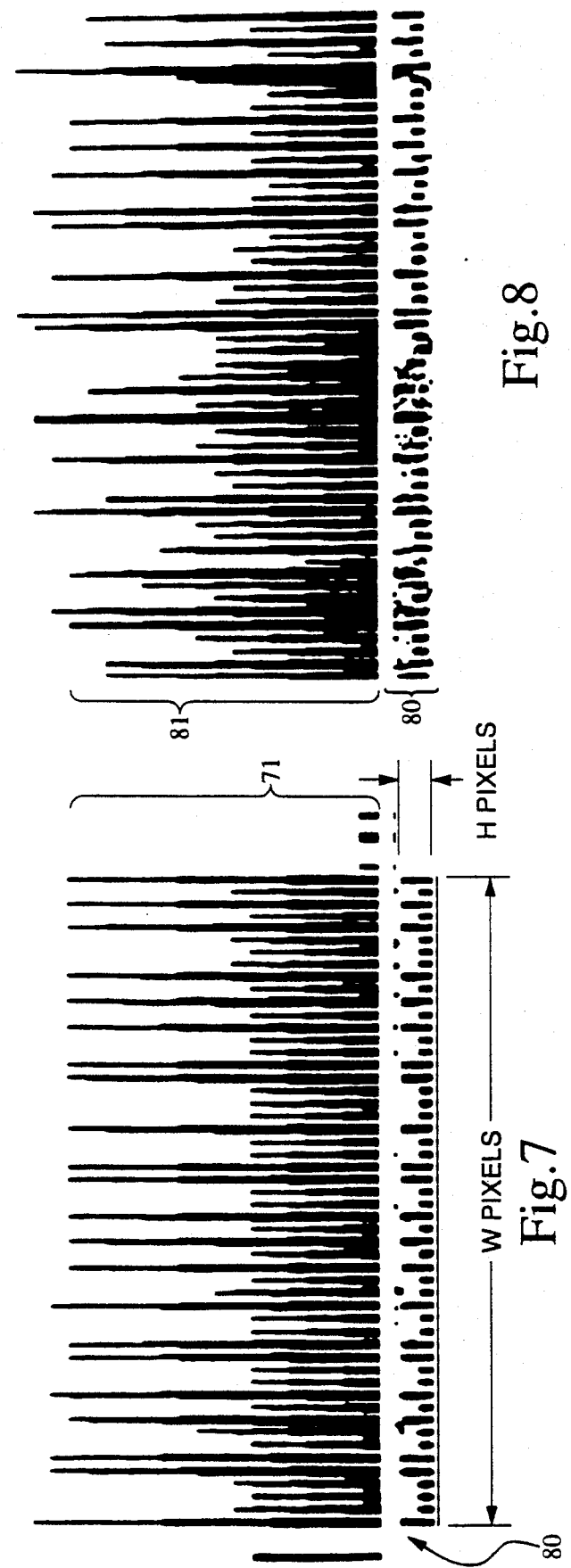
FIG. 7 is an example of a bar code image and vertical histograms formed therefrom.
FIG. 8 is a bar code image appearing on a noisy background and vertical histograms therefrom.

FIG. 7 shows the vertical histograms constructed from the bar code 42 of FIG. 4. The digitized bar code 70 is W pixels in length, and H pixels in height. As can be seen when examining FIG. 7, the maxima of vertical histograms 71 correspond to the full bars in bar code 70 and are easily distinguishable from vertical histograms corresponding to half-bars in bar code 70.

FIG. 8 shows the preprocessed digital image 80 of a bar code subjected to heavy background noise. Vertical histograms 81 demonstrate that it is possible to determine the threshold value that will render a valid POSTNET binary code corresponding to the bar code 80 from the vertical histograms 81.

Coupled with the vertical histogram logic, as shown in FIG. 3, is POSTNET pattern decode and error correct circuit 34. The POSTNET pattern decode and error correct circuit 34 receives from the vertical histogram logic 33 a binary digital signal on line 36 corresponding to the binary pattern recognized by the vertical histogram logic 33. The POSTNET pattern decode and error correct circuit 34 determines whether or not the recognized bar code pattern is a POSTNET bar code pattern. This step can be referred to as an examination for validity. For the recognized bar code pattern to be valid, two conditions must be met. First, the total number of binary digits represented by the bar code pattern, including frame bits, must be of a certain length: thirty-two and fifty-two are valid outside the current clear zone; a length of sixty-nine is also valid if its within the clear zone. Second, each five bar character must consist of two ones and three zeros or, in other words, of two full bars and three half-bars. If a character contains a single indeterminate value and the number of zeros in it is two or three, the character can be corrected by substituting a zero if two zeros are present, or a one if three zeros are present. If the character contains five determinate bits, and includes two or four zeros, correction is possible through the use of the check bit, providing that all other characters are interpretable. Furthermore, in the present invention, the vertical histogram data remains available. The vertical histograms can be reinterpreted to arrive at a reliable and valid binary pattern corresponding to the bar code. To interpret the data, the threshold values are slightly adjusted. If a valid binary pattern results, the probability that it is the correct binary pattern is extremely high.

The output of the POSTNET pattern decode and error correct circuit 34 is a binary digital signal on line 37 corresponding to the binary pattern of the bar code, and it is presented to POSTNET pattern priority logic circuit 35. The process of deciding on a bar code value must consider the possibility of two or more valid POSTNET codes appearing on a mailpiece. The process of deciding the priority of which bar code to use is accomplished by using the position associated with each bar code image and the decision matrix provided by the United States Postal Service. The POSTNET pattern priority logic 35 thus also receives bar pattern coordinate data signal 31 to determine the position associated with each bar code image. Logic 35 also has access to the digital image, created from the one-bit binary digital data signal 8, stored in the image buffer 32 for this purpose.

The output of the POSTNET priority logic 35 is a one-bit binary digital signal corresponding to the selected bar code, and is presented to interface logic 12 that permits interfacing of the bar code image processing system with post-processing uses.

The bar code image processor 9, including image buffer 32, can be a single-board, microprocessor-based computer, or any suitable equivalent.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

We claim:

1. A bar code location and recognition system for locating a digitized image of a bar code, comprising:
    means for converting an image of the surface of an object imprinted with a bar code pattern having at least two bars of different pitch to a digital image having an array of black and white pixels in rows and columns;
    means for generating an L-shaped pattern characteristic of a digitized image of the bar code pattern when black pixels are summed along segments of each row containing a portion of the digital image of the bar code pattern; and
    means for locating the coordinates of the L-shaped pattern in a region within the array of pixels containing the digitized image of the bar code pattern.

2. The bar code location and recognition system as set forth in claim 1 further comprising means for recognizing the digitized image of the bar code pattern, including:
    means for counting the number of black pixels in each column within said region containing the digitized image of the bar code pattern; and
    means for setting threshold values for the black pixel counts in order to determine from the counts the pattern of bars in the digitized image of the bar code pattern.

3. A bar code location and recognition system comprising means for recognizing the digitized image of the bar code pattern including:
    means for converting an image of the surface of an object imprinted with a bar code pattern having at least two bars of different pitch to a digital image having an array of black and white pixels in rows and columns;
    means for summing the number of black pixels in each column within the region containing the digitized image of the bar code pattern;
    means for generating a first threshold value for distinguishing between peaks caused by the bars of the bar codes and peaks caused by background; and
    means for generating additional threshold values to distinguish between peaks due to bars of different pitches to determine the pattern of bars in a digitized image of the bar code pattern.

4. A bar code pattern processor for locating and recognizing a digitized image of a full-bar half-bar code pattern generally oriented in a horizontal direction anywhere within an array of pixels containing the digitized image of a surface containing the full-bar halfbar pattern, each pixel being either black or white and the array having rows and columns of spaced pixels divided into vertical segments containing a plurality of columns, comprising:
    means for locating the region within the array of pixels containing the digitized image of a full-bar halfbar code pattern including:
        means for summing within sets of consecutive segments the black pixels in a set for generating an L-shaped pattern of the sums of the sets corresponding to the digitized full-bar half-bar code pattern,
        means for comparing a set of consecutive segments from one horizontal row with sets of the same segments from adjacent horizontal rows to locate the changes in the sum of the sets due to the L-shaped pattern, and
        means for generating from the sets of segments and rows containing the L-shape pattern coordinate data for the region in the array of pixels containing the full-bar half-bar code image; and
    means for recognizing the pattern of full-bars and half-bars in the digitized image of the full-bar half-bar code pattern including:
        means for counting the number of black pixels in a column within the boundaries of the region defined by the coordinate data, and
        means for generating a first threshold value to distinguish between peaks in the number of black pixels caused by full-bars and half-bars and background noise, and a second threshold value to distinguish between peaks due to full-bars and peaks due to half-bars to establish the pattern of fullbars and half-bars in the digitized image of the fullbar half-bar code pattern.

5. A method of locating a digitized bar code image generally oriented in the horizontal direction anywhere within an array of pixels, said pixels comprising the digitized image of the surface of an object printed with a bar code pattern having bars of more than one pitch, said pixels being either black or white, said array having rows of spaced pixels and columns of spaced pixels and divided into vertical segments containing a plurality of columns, comprising the steps of:
    (a) summing the number of black pixels found in a row within a set of vertical segments having at least one consecutive segment;
    iterating step (a) across each row of said array by summing the number of black pixels in a set of consecutive vertical segments shifted by one segment from the previous set;
    (c) determining from the sums generated by steps (a) and (b) relatively abrupt changes indicating the presence of a digitized image of a bar code pattern having bars of more than one pitch in the sums of black pixels from one set of segments on one row to the same set of segments on adjacent rows; and
    (d) locating from the position of the identified abrupt changes the region of the array of pixels containing the digitized image of the bar code pattern.

6. The method of locating a digitized bar code image as described in claim 5, further comprising the steps of:
    (a) summing the pixels in each vertical column from the bottom of said region to the top of said region;
    (b) locating those columns in which peaks in the number of black pixels occur;
    (c) generating a first threshold value for distinguishing between peaks caused by the bars of the bar codes and peaks caused by the background; and (d) generating additional threshold values to distinguish between peaks due to bars of different pitches to determine the pattern of parts in the digitized image of the bar code pattern.

7. A method of recognizing a digitized bar code image in a region generally oriented in the horizontal direction anywhere within an array of pixels, said pixels comprising the digitized bar code image of the surface of an object printed with a bar code pattern having bars of more than one pitch, and said pixels being either black or white, said array having rows and columns of spaced pixels, comprising the steps of:
(a) summing the black pixels in each vertical column from the bottom of the region containing the digitized bar code image of the bar code pattern to the top of the region;
(g) generating a first threshold value for distinguishing between peaks in the number of black pixels caused by the bars of the bar codes and peaks caused by the background; and
(c) generating additional threshold values to distinguish between peaks in the number of black pixels due to bars of different pitches in order to determine the pattern of bars in the digitized bar code image of the bar code pattern.

8. Apparatus for locating a bar code pattern on an object, comprising:
means for converting an image of the surface of the object imprinted with the bar code pattern to a digital image having an array of black and white pixels in rows and columns;
means for generating a horizontal histogram from the rows of pixels characteristic of the digital image of the surface of the object, the generated horizontal histogram for the bar code having a characteristic L-shaped pattern; and
means for locating, from the generated horizontal histogram, a region within the array of pixels containing the digitized image of the bar code pattern by locating areas of the horizontal histogram having the characteristic L-shaped pattern.

9. Apparatus for locating a bar code pattern as set forth in claim 8 wherein said means for generating includes means for horizontally summing the number of black pixels in a predetermined number of successive segments of the digital image of the object.

10. Apparatus for locating a bar code pattern as set forth in claim 9 wherein said means for generating further includes logic circuits for generating the horizontal histogram coincident with the means for converting the image of the surface of the object to the digital image.

11. The method of locating a digitized bar code image having horizontal and vertical direction anywhere within an array of pixels, the pixels generated by digitizing the image of the surface of an object having been printed with a bar code pattern, said pixels being either black or white and the array having rows of spaced pixels arranged in a horizontal direction and columns of spaced pixels arranged in a generally vertical direction such that the array includes a plurality of rows and a plurality of columns, comprising the steps of:

generating a horizontal histogram from the rows of pixels characteristic of the digitized image of the surface of the object, the generated histogram for a bar code having an L-shaped pattern; and
locating within the array of pixels containing the digitized image of the bar code pattern an area of the generated horizontal histogram containing the L-shaped pattern.

12. The method of locating a digitized bar code image as set forth in claim 11 wherein the step of generating a horizontal histogram includes the steps of horizontally summing the number of black pixels in a predetermined number of successive segments in a row of the digitized image of the object.

13. The method of locating a digitized bar code image as set forth in claim 12 wherein the step of locating an area within the generated horizontal histogram includes the step of identifying abrupt changes in the in the summed total of black pixels for consecutive rows for a given segments of the horizontal histogram.

14. A bar code pattern processor for locating and recognizing a digitized image of the bar code pattern having a generally horizontal direction and a generally vertical direction anywhere within an array of pixels containing the digitized image of a surface containing the bar code pattern, each pixel being either black or white, the array having rows and columns of spaced pixels, comprising:
means for generating a horizontal histogram characteristic of the digitized image of the bar code pattern from the rows of pixels, each row containing a portion of the digitized image of the bar code pattern;
means for generating a vertical histogram characteristic of the digitized image of the bar code pattern from the columns of pixels, each column containing a portion of the digitized image of the bar code pattern;
means for locating coordinates of the horizontal histogram in a region within the array of pixels containing the digitized image of the bar code pattern; and
means for testing the vertical histogram to identify the validity thereof for recognition of the digitized image.

15. A bar code pattern processor as set forth in claim 14 wherein said means for generating the horizontal histogram includes means for summing the black pixels in the rows of the array in a predetermined number of successive segments of the bar code pattern.

16. A bar code pattern processor as set forth in claim 14 wherein said means for locating includes means for identifying a horizontal histogram with a particular bar code pattern.

17. A bar code pattern processor as set forth in claim 14 wherein the array of pixels includes a plurality of digitized images, further comprising:
means for prioritizing of the plurality of bar code patterns in the array to identify the pattern to be located.

* * * * *

UNITED STATES PATENT AND TRADEMARK OFFICE
CERTIFICATE OF CORRECTION

PATENT NO. : 5,073,954            Page 1 of 2

DATED : December 17, 1991

INVENTOR(S) : Richard G. Van Tyne, et al

It is certified that error appears in the above-identified patent and that said Letters Patent is hereby corrected as shown below:

Col. 3, line 53, change "POSNET" to --POSTNET--;

Col. 3, line 58, change "ton" to --ten--;

Col. 4, line 53, delete semicolon and insert a period;

Col. 7, line 31, change "Pixel" to --pixel--;

Col. 9, line 10, delete slash mark;

Col. 11, line 66, change "halfbar" to --half-bar--;

Col. 12, line 5, change "halfbar" to --half-bar--;

Col. 12, line 32, change "fullbars" to --full-bars--;

Col. 12, line 33, change "fullbar " to --full-bar--

Col. 12, line 47, insert "(b)" before "iterating";

Col. 13, line 3, change "parts" to --bars--;

Col. 13, line 17, change "(g)" to --(b)--;

Col. 13, line 52, change "The" to --A--;

Col. 14, line 11, change "steps" to --step--;

UNITED STATES PATENT AND TRADEMARK OFFICE
CERTIFICATE OF CORRECTION

PATENT NO. : 5,073,954

DATED : December 17, 1991

INVENTOR(S) : Richard G. Van Tyne, et al

It is certified that error appears in the above-identified patent and that said Letters Patent is hereby corrected as shown below:

Col. 14, line 20, change "segments" to --segment--.

Signed and Sealed this

First Day of June, 1993

Attest:

MICHAEL K. KIRK

*Attesting Officer*   Acting Commissioner of Patents and Trademarks